United States Patent
Mandel et al.

[11] 4,013,993
[45] Mar. 22, 1977

[54] ELEVATOR SYSTEM

[75] Inventors: Alan F. Mandel, Pittsburgh, Pa.;
Theodore E. Frask, Wayne, N.J.;
Denis E. Bedel, Pittsburgh, Pa.

[73] Assignee: Westinghouse Electric Corporation, Pittsburgh, Pa.

[22] Filed: Mar. 22, 1976

[21] Appl. No.: 669,014

[52] U.S. Cl. .............................. 340/19 R; 307/66;
315/86; 340/333; 350/160 LC
[51] Int. Cl.² .................. G02F 1/13; G08B 5/36
[58] Field of Search ........... 340/19 R, 333; 315/86;
307/64, 66, 67; 350/160 LC

[56] References Cited
UNITED STATES PATENTS

| | | | |
|---|---|---|---|
| 1,469,946 | 10/1923 | Morrison | 340/333 |
| 2,518,920 | 8/1950 | Merker et al. | 340/19 R |
| 3,486,068 | 12/1969 | Dunn et al. | 315/86 |
| 3,609,730 | 9/1971 | Hornung | 340/333 |
| 3,660,714 | 5/1972 | Chandler | 315/86 |
| 3,677,370 | 7/1972 | Devine | 340/19 R |
| 3,906,243 | 9/1975 | Herzog | 315/86 |
| 3,912,977 | 10/1975 | Fillmore | 350/160 LC |
| 3,920,996 | 11/1975 | Moore | 350/160 LC |

FOREIGN PATENTS OR APPLICATIONS

686,796   1/1953   United Kingdom ............ 315/86

Primary Examiner—David L. Trafton
Attorney, Agent, or Firm—D. R. Lackey

[57] ABSTRACT

An elevator system including an elevator car mounted for movement in a building to serve the floors therein. The elevator car includes a car call station with a continuously energized light source associated with certain display functions. An emergency source of electrical potential is applied to this light source when the normal source of electrical potential fails, and this light source provides emergency lighting for the elevator car by providing light transmitting portions on the car call station panel and/or by operating electro-optic light valves located on the car call entry station to their light transmitting condition. The electro-optic light valves used for the emergency lighting function may be those utilized for other display purposes during normal operation of the car call entry station, and/or light valves which are only operated during use of the emergency source of electrical potential.

11 Claims, 6 Drawing Figures

ELEVATOR SYSTEM

BACKGROUND OF THE INVENTION

1. Field of the Invention

The invention relates in general to elevator systems, and more specifically to elevator systems with provisions for emergency lighting of the elevator car.

2. Description of the Prior Art

In addition to the conventional light source in an elevator car, a separate light source for use during an emergency is often specified. The special light source must provide adequate illumination in the vicinity of the car call entry station without providing a rapid discharge of the batteries used during the emergency. Certain elevator safety codes have been recently revised to make such emergency lighting mandatory within the jurisdiction of the specific code, and the time is rapidly approaching when all elevator codes will specify that certain minimum levels of illumination be maintained adjacent the car station during failure of the conventional building electrical power supply.

When emergency lighting is specified or required by a particular code, it is common to purchase the emergency lighting system as a package and add it to the elevator car. In addition to being costly, the emergency lighting system may detract from the appearance of the elevator car, and the mounting of the emergency lighting fixture is sometimes difficult due to dropped ceiling designs.

Thus, it would be desirable to provide a new and improved elevator system including an emergency lighting system for the elevator car which is less costly than conventional emergency lighting arrangements, and which blends well with the car appearance and construction.

SUMMARY OF THE INVENTION

Briefly, the present invention is a new and improved elevator system which includes an emergency lighting system for an elevator car which adds very little to the cost of the elevator system. Further, instead of detracting from the appearance of the elevator car, the emergency lighting system may be incorporated as a distinctive attractive portion of the car call entry station which automatically functions as a complete source of emergency lighting for the car.

The car station of the invention includes a normally continuously energized light source, such as a fluorescent lamp, disposed immediately behind the externally visible portion of the car call entry station. The car call entry station includes a plurality of car call pushbuttons or switches, with each switch having an associated electro-optic light valve disposed between the switch and the light source. Actuation of a switch by a passenger operates the associated light valve from a light blocking to a light transmitting condition, to illuminate the switch and visually indicate to the passenger that the car call has been registered. When a car call is served by a car, the associated light valve is operated back to the light blocking condition.

The present invention utilizes the normally continuously energized light source in the car call entry station as the source of light for emergency lighting purposes. In one embodiment of the invention, loss of normal electrical potential activates a battery operated source of electrical potential which maintains the light source in the car call entry station operative, as well as the electro-optic light valves. The switch to the emergency source of electrical potential operates each electro-optic light valve to its light transmitting condition, such as by providing a signal which sets a car call for each floor. The plurality of light transmitting light valves will normally provide the required minimum level of illumination in the vicinity of the car station. However, additional light may be provided by adding additional electro-optic light valves to the car call entry station panel which are operated to their light transmitting condition only during the emergency lighting condition. Additional electro-optic light valves may be especially desirable when the car call station contains only a few pushbuttons or switches. The car call entry station may also be constructed such that the panel member which contains the switches includes both opaque and light transmitting portions. The light transmitting portions may be constructed of translucent plastic members disposed in a configuration designed to add to the appearance of the panel. In a preferred embodiment, the light transmitting portion of the panel forms a border which completely encircles the car call switches or pushbuttons, providing a "ring of light" about the car call pushbuttons. The functional aspect of the light transmitting portions of the panel is not apparent until the conventional light source in the elevator car fails. The light transmitting portions of the car station panel, the electro-optic light valves associated with the car call pushbuttons, and additional electro-optic light valves, may be used singly or in any combination, as required to achieve the required level of illumination.

Since a source of light is used which is already in the elevator car, its dual use as a source of emergency lighting adds little to the cost of the elevator car. Further, there is no mounting problem, and instead of detracting from car appearance, the car station may be constructed such that the emergency lighting actually enhances car appearance without disclosing its functional aspect until normal car illumination is lost.

BRIEF DESCRIPTION OF THE DRAWING

The invention may be better understood, and further advantages and uses thereof more readily apparent, when considered in view of the following detailed description of exemplary embodiments, taken with the accompanying drawings in which.

DESCRIPTION OF PREFERRED EMBODIMENTS

Figures 1, 6:
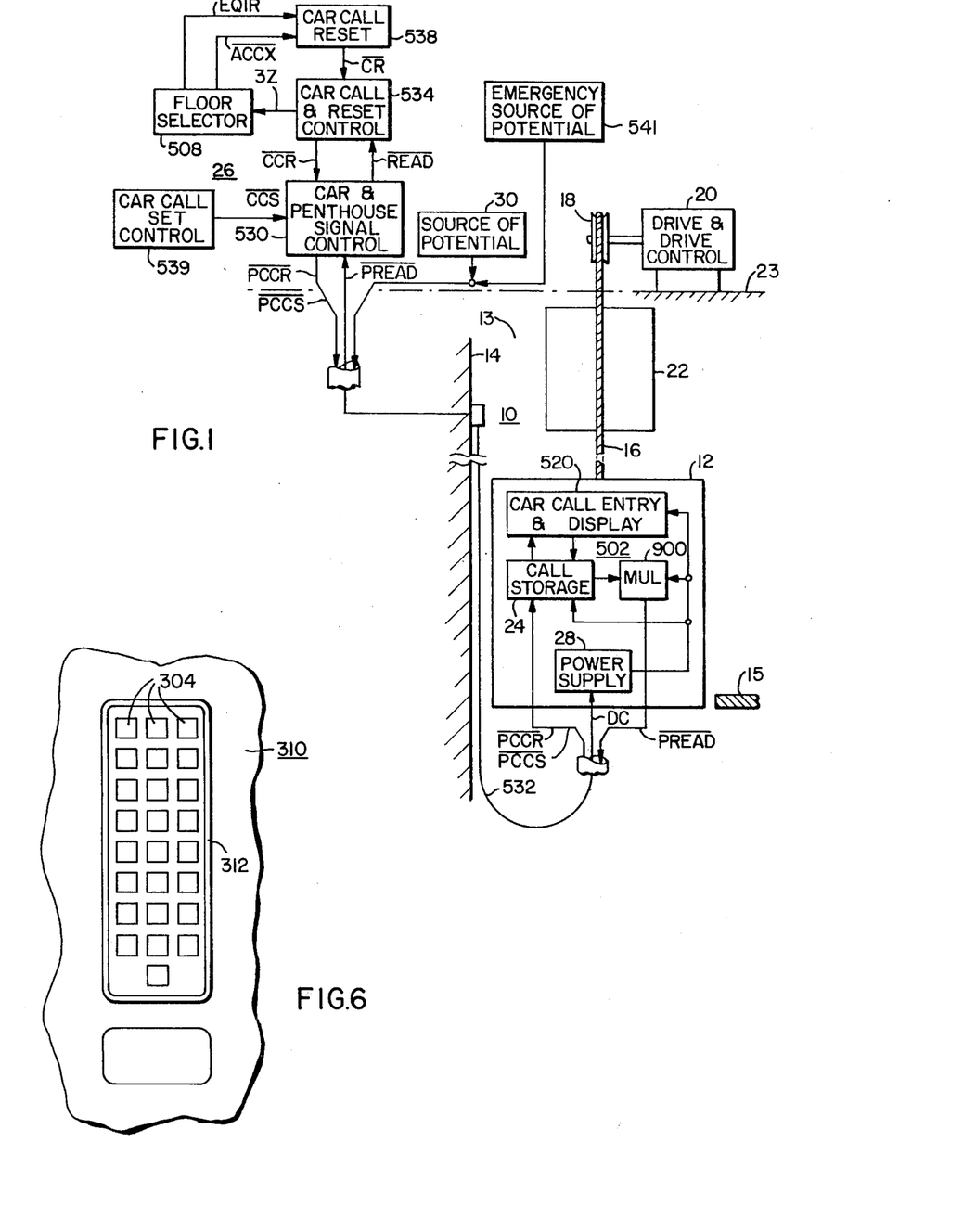
FIG. 1 is a diagrammatic representation of an elevator system which may utilize the teachings of the invention.
FIGS. 5 and 6 are internal views of an elevator car and its car call entry station illustrating desirable embodiments of the invention.

Referring now to the drawings, and FIG. 1 in particular, there is shown an elevator system 10 which may utilize the teachings of the invention. While the elevator system 10 illustrated in FIG. 1 is of the traction type, it is to be understood that the invention is equally applicable to elevator systems with any type of motive means, such as hydraulic elevators.

Only that part of a complete elevator system necessary to understand the invention is shown in FIG. 1 and the remaining Figures. For purposes of example, it will be assumed that the elevator system 10 utilizes the floor selector and other car control disclosed in U.S. Pat. No. 3,750,850. U.S. Pat. No. 3,807,531 discloses modifications to the floor selector shown in U.S. Pat. No. 3,750,850 for group supervisory control by a system processor, as well as new and improved apparatus for serializing and multiplexing car calls from the car station over the traveling cable to the remotely located floor selector. The elevator system disclosed in these patents continuously generates scan or time slots in a binary scan counter, with the floors of the associated building each being related to a different scan slot. Floor related information is serialized and it appears in the scan slot associated with that floor.

Further, signal input devices having a continuously energized light source suitable for use in a car station constructed according to the teachings of the invention are disclosed in co-pending Application Ser. No. 578,302, filed May 16, 1975, entitled "Signal Input Devices and Systems".

The above-mentioned U.S. patents and patent application, which are all assigned to the same assignee as the present application, are hereby incorporated into the present application by reference. Where applicable, the signals and reference numerals used in these incorporated patents and patent application will be used in the present application when describing similar signals and functions.

Elevator system 10 includes an elevator car 12 mounted in a hatchway 13 for movement relative to a structure or building 14 having a plurality of floors or landings, illustrated generally at 15. The elevator car 12 is supported by a plurality of wire ropes, shown generally at 16, which are reeved over a traction sheave 18 mounted on the shaft of a drive motor 20. A counterweight 22 is connected to the other end of the ropes 16. The drive motor 20 and its associated control are generally mounted in a machine room located in a penthouse, or other suitable portion of the building, with the machine room being shown in general as being above the broken line 23 in FIG. 1. A car station 502 is mounted in the elevator car 12, and it includes a car call entry and display panel 520, means 24 for storing the car calls until they are reset by the response of the elevator car in servicing the call, and a multiplexer circuit 900 for multiplexing the car calls and other car station signals to provide a serial signal $\overline{PREAD}$ for transmission to the remotely located portion 26 of the car control over a traveling cable 532. The car station 502 also includes a power supply 28 which receives alternating and unidirectional potentials from a machine room source 30 via the traveling cable 532.

The car control 26 located remotely from the elevator car 12, may also be located in the machine room with the drive and drive control 20. This portion of the car control includes a floor selector 508, car and penthouse signal control 530, car call and reset control 534, car call reset control 538, and car call set control 539. Control 530 receives a signal $\overline{PREAD}$, separates the serialized car calls from the other car related signals, and sends the serialized car calls to the car call and reset control 534 as the signal $\overline{READ}$. The car call and reset control 534 sends serial car calls to the floor selector 508 as signal 3Z.

Car call reset control 538 receives a serial advanced car position signal EQ1R, and an acceleration request signal ACCX from the floor selector 508. When signal ACCX goes high (to a logic one) it indicates a deceleration request has been made for the elevator car to stop at the floor of the advanced car position signal EQ1R, and a car call reset signal $\overline{CR}$ is generated in the scan or time slot associated with the floor of the advanced car position. Serialized reset signals $\overline{CR}$ are sent to the car call and reset control 534 from the car call reset 538, control 534 sends serialized car call resets $\overline{CCR}$ to the car and penthouse signal control 530. The car and penthouse signal control 530 processes the car call resets and sends them to the call storage 24 in the car station 502, over the traveling cable 532, as serial signal $\overline{PCCR}$. The serialized reset signal resets the appropriate memory element in the call storage 24, and removes the car call registered indication on the car call entry and display panel 520.

Car calls may be entered remotely from a pushbutton panel in the car call set control 539 located in the machine room, which function is used by service personnel during maintenance of the elevator system. Car call sets are serialized by control 539 and sent as a serialized logic level signal $\overline{CCS}$ to the car and penthouse signal control 530. Control 530 processes the signal $\overline{CCS}$ into a serial power level signal $\overline{PCCS}$ which is sent to the call storage 24 in the car station 502 via the traveling cable 532.

An emergency source 541 of alternating and unidirectional potentials is also provided in the machine room, which will be hereinafter described.

Figure 2:
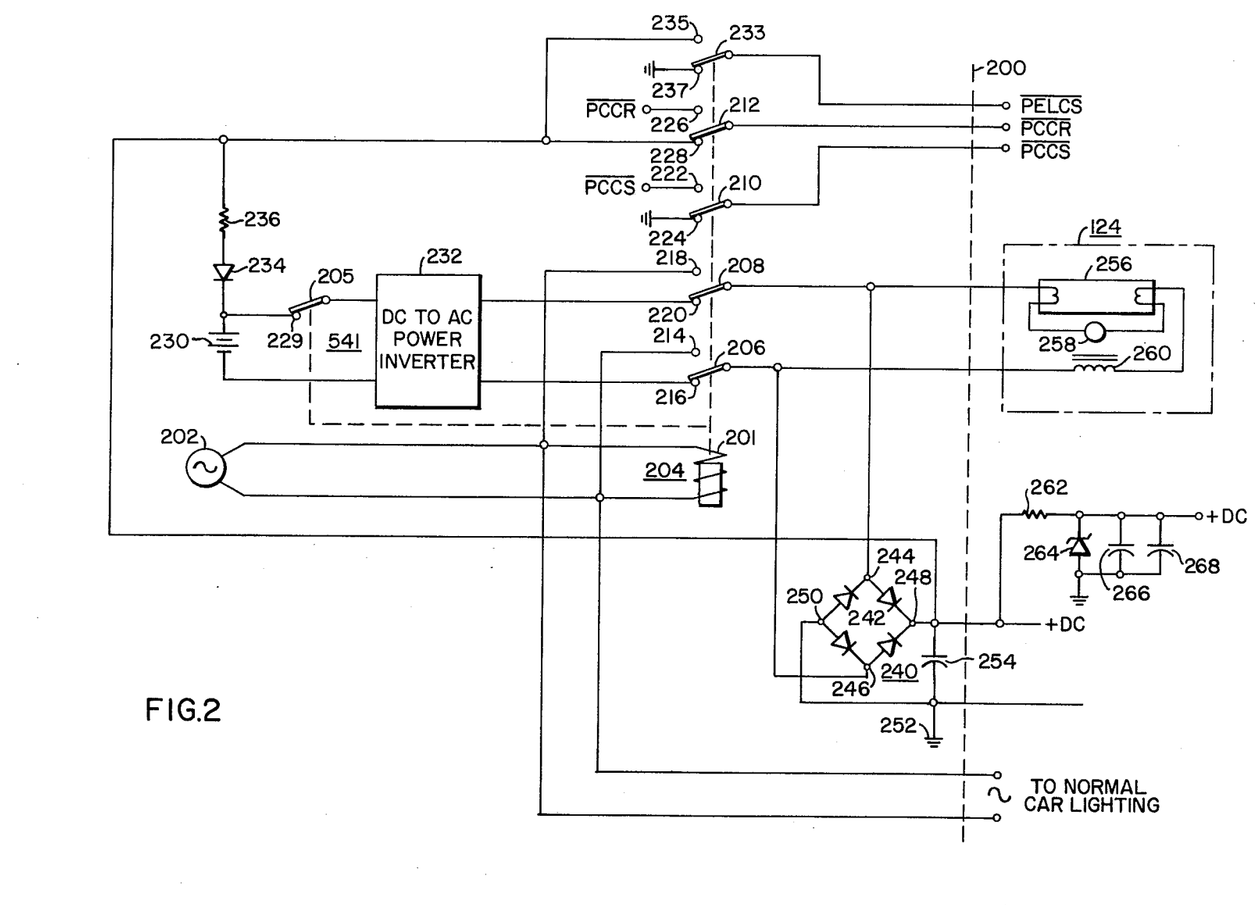
FIG. 2 is a schematic diagram of the normal and emergency sources of electrical potential connected according to the teachings of the invention.

FIG. 2 is a schematic diagram of the normal and emergency electrical power systems for the elevator system 10 shown in FIG. 1. The vertically oriented broken line 200 divides apparatus which is located in the machine room from apparatus located in the elevator car 12. The apparatus to the left of line 200 is located in the machine room, and apparatus to the right of the line 100 is located in the elevator car. The wires extending across the broken line 200 would be located in the traveling cable 532 shown in FIG. 1.

The normal electrical power for elevator car 12 is provided by a source 202 of alternating potential, which is from the normal building power distribution system. Source 202 energizes the electromagnetic coil 201 of an emergency lighting relay 204 which operates movable contacts 206, 208, 210, 212 and 233 between make and break stationary contacts, and a movable contact 205 relative to a break contact. Movable contact 206 is operated between make and break contacts 214 and 216, respectively, movable contact 208 is operated between make and break contacts 218 and 220, respectively, movable contact 210 is operated between make and break contacts 222 and 224, respectively, movable contact 212 is operated between make and break contacts 226 and 228, respectively, and movable contact 233 is operated between make and break contacts 235 and 237, respectively. Movable contact 205 is operated relative to a break contact 229. Make contacts 214 and 218 are connected to the normal source 202 of alternating potential, while the break contacts 216 and 220 are connected to the emergency source 541 of alternating potential. The emergency source 541 may include a battery 230, a DC to AC power converter 232, a diode 234, and a resistor 236. The battery 230 is connected to the power inverter 232 via stationary contact 229 and movable contact 205 of the emergency lighting relay 204. The battery 230 is trickle charged during normal power condition via resistor 236 and diode 234 from a source 240 of unidirectional potential in the machine room. The alternating output potential of power inverter 232 is connected to break contacts 220 and 216 of relay 204.

The source 240 of unidirectional potential may be a single phase, full-wave bridge rectifier 242 having input terminals 244 and 246 connected to the movable contacts 206 and 208 of relay 204, and a unidirectional output potential appears at output terminals 248 and 250. Output terminal 250 is connected to ground 252. A filter capacitor 254 may be connected from output terminal 248 to ground 252. The output of the unidirectional source 240 provides the unidirectional potential required in the machine room, such as for charging battery 230, and it is also connected to the elevator car 12 via the traveling cable. A 12 volt unidirectional power supply in car for operation of the solid state control devices therein may be provided from the 125 volt DC supply via a resistor 262, a Zener diode 264, and capacitors 266 and 268.

The movable contacts 206 and 208 of relay 204, in addition to being connected to the unidirectional source 240, are connected to the elevator car via the traveling cable to provide an alternating potential for light source 124 associated with the car call entry and display 520 shown in FIG. 1. As indicated light source 124 may include a fluorescent lamp 256, a starter 258, and a ballast 260. The alternating potential for normal car lighting purposes would also be obtained from source 202, but it would not be directed to the car through the emergency lighting relay 204.

Make contacts 222 and 224 of relay 204 are connected to receive serial set and reset signals $\overline{PCCS}$ and $\overline{PCCR}$, respectively, from the car and penthouse signal control 530 shown in FIG. 1, break contact 224 is connected to ground, break contact 228 is connected to the source 240 of unidirectional potential, and movable contacts 210 and 212 are connected to provide the signals $\overline{PCCS}$ and $\overline{PCCR}$, respectively, in the car station.

If electro-optic light valves are provided in the car station which are operated to their light transmitting condition only during an emergency power condition, the movable contact 233 and its stationary contacts 235 and 237 may be connected to provide a signal for driving the additional electro-optic light valves. The make contact 235 is connected to the source 240 of unidirectional potential, the break contact 237 is connected to ground, and the movable contact 233 is connected to the car station to provide a signal $\overline{PELCS}$. When signal $\overline{PELCS}$ goes low, it causes the additional electro-optic light valves in the car station to be operated to their light transmitting condition.

During normal operation, relay 204 is energized from alternating potential source 202, movable contact 205 opens the circuit between the battery 230 and the power inverter 232, and the battery 230 is on trickle charge from the unidirectional source 240. Movable contacts 206 and 208 are in contact with the make stationary contacts 214 and 218, respectively, connecting light source 124 to the conventional source 202 of alternating potential. Movable contacts 210 and 212 are in contact with the stationary make contacts 222 and 226, respectively, enabling normal remote car call sets, and car call resets to occur. Movable contact 233 is in contact with make contact 235, providing a high signal $\overline{PELCS}$ which holds any special purpose, ie., emergency lighting only, electro-optic light valves in their light blocking condition.

When the normal source 202 of alternating potential fails, relay 204 drops to connect the battery 230 to the power inverter 232, and the output of the power inverter is connected to movable contacts 206 and 208 and thus to source 240 of unidirectional potential and to the light source 124 in the car station associated with the car call entry and display. The diode 234 prevents the battery 230 from providing electrical energy for anything except the power inverter 232. Thus, the lamp 256 remains energized during a power failure, as does the DC operated solid state electronics associated with the car call entry and display 520.

During failure of the normal alternating supply potential 202, movable contact 210 makes contact with stationary contact 224, which is connected to ground. Thus, a car call set appears in every scan slot, setting car calls for each floor. The electro-optic light valves in the car call entry and display 520 are all operated to their light transmitting condition and allow light source 124 to illuminate every car call button or switch simultaneously. Movable contact 233 will make contact with the stationary contact 237 providing a low signal $\overline{PELCS}$, which causes any additional electro-optic light valves to be switched to their light transmitting condition.

When relay 204 drops out, movable contact 212 makes contact with the stationary contact 228 which is connected to unidirectional source 240, to prevent any car call from being reset. This insures that all electro-optic light valves associated with the car call pushbutton station will remain in the light transmitting condition.

When normal power returns, the car call set and reset signals $\overline{PCCS}$ and $\overline{PCCR}$ will again be operative, and the signal $\overline{PELCS}$ will go high to switch any additional electro-optic light valves to their light blocking condition.

Figure 3:
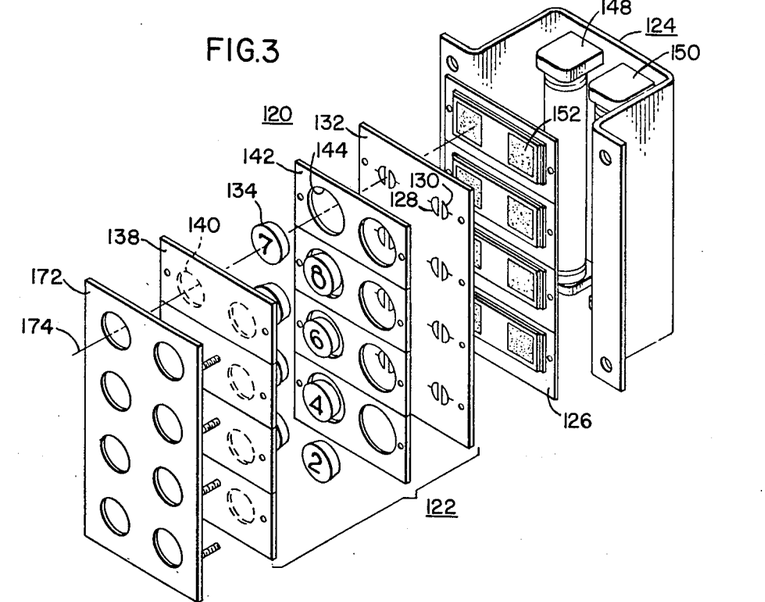
FIG. 3 is an exploded, perspective view of a car call station having a plurality of car call pushbuttons or switches and a normally continuously energized source of light, which may be used for the car entry and display station shown in FIG. 1.

FIG. 3 is a perspective view of a new and improved signal entry station 120 which may be used in the elevator car call entry and display station 520 shown in FIG. 1. Signal entry station 120 includes a plurality of switches 122, a light source 124 adapted for continuous energization during normal and emergency power conditions, as described relative to FIG. 2, and a plurality of electro-optic light valves 126.

The plurality of switches 122 may include any desired number of switches, with eight being illustrated for purposes of example. The switches may be of any suitable construction, with the construction of the switches shown in FIG. 3 being for illustrative purposes only. The switches 122 will only be briefly described, as a complete description is included in the incorporated co-pending application. The switches 122 each include first and second spaced stationary electrically conductive elements, electrodes or contacts, such as electrodes 128 and 130, all of which are disposed on a common surface of a sheet of electrical insulating material, such as printed circuit board 132. The electrodes 128 and 130 are formed of copper, or other suitable electrically conductive material. The printed circuit board 132 is formed of light transmissive material, i.e., transparent or translucent, with a polycarbonate such as Lexan or Rexolite, being suitable.

The first and second stationary electrodes of the switches are preferably connected in an X-Y matrix by conductors which are also applied to the surface of printed circuit board 132 when the stationary electrodes are applied thereto. It will be assumed for purposes of example that the switches 122 are of the movable electrode capacitive type, but they may be of the ohmic contact type, if desired.

The movable electrodes each include a flat, circular metallic surface. In the embodiment shown in FIG. 3, the movable electrode is provided by cylindrical metallic members, such as metallic member 134. The cylindrical metallic members are resiliently spaced from its associated stationary electrodes, such as by a conventional metallic spring arrangement, or by fastening one end of the cylindrical metallic members to a resilient or flexible plastic sheet member 138. Sheet member 138 may have blind openings 140 therein which extend inwardly from one of its major surfaces, with the blind openings 140 being sized to capture flanges disposed on members 134 when the sheet member 138 is suitably flexed to enlarge the blind opening. The flexible sheet members, such as sheet member 138, are formed of light transmissive material, either translucent or transparent.

Each movable electrode is disposed in spaced relation from its associated stationary electrodes by a spacer member 142 which has an opening therein for each switch. The openings in spacer member 142, such as opening 144, are sized to allow the resilient member 138 to be manually depressed such that the movable electrode advances a predetermined dimension towards its associated stationary electrodes, and when the pressure is released, the resilient member returns the movable electrode to its former position. The spacer member 142 may be formed of any suitable material, and may be opaque, or light transmissive, as desired.

The light source 124 is an electric lamp, preferably a mercury vapor lamp such as a fluorescent lamp, but any source of visible light may be used, conventional or solid state. FIG. 3 illustrates two fluorescent lamps 148 and 150, with the second lamp being a backup.

The plurality of electro-optic light valves 126 includes a light valve for each switch, such as light valve 152. The electro-optic light valve is a passive device, i.e., it is not a light source. It is a light shutter or valve, operable between light blocking and light transmitting conditions by application and removal of an electrical signal. While any suitable electro-optic light valve may be used, such as a dynamic scattering liquid crystal, or a field effect liquid crystal, the latter is preferred in an elevator application because of its miniscule use of electrical power. In an elevator car call entry station, the field effect liquid crystal 152 is preferably constructed to be opaque in the absence of an electrical field applied to its electrically conductive electrodes. When a suitable electrical field is applied thereto, the molecular orientation of the liquid crystal material changes and the device thus changes from a light blocking state to a transparent state. The energizing source or liquid crystal driver is preferably an alternating current source, such as 60 Hz. to 3 KHz., as alternating drive voltages enable an operating life in excess of 50,000 hours to be achieved.

The plurality of liquid crystals 126 are disposed between the plurality of switches 122 and the light source 124, and a cover 172 is disposed over the sheet member 138. Cover 172 has a plurality of openings therein, such as opening 174, which openings have about the same diameter as the openings in the spacer member 142. When the various components are sandwiched together, the center lines of the various openings are coaxial, as indicated by axis 174. this axis is also the center line of the movable electrode, it intersects the space between the stationary electrodes, and it strikes the midpoint of the electro-optic light valve.

In an elevator car call application, all of the field effect liquid crystals 126 would be normally deenergized and the light provided by the continuously energized light source 124 would be barely visible on the front or actuating sides of the switches 122. When a pushbutton is depressed to couple a high frequency signal through the are relatively high capacitance of the actuated switch, a voltage is applied to the associated liquid crystal and it switches from an opaque to a light transmissive condition. Since the printed circuit board 132 and the sheet member 138 are formed of light transmissive materials, the light which is transmitted through the liquid crystal is visible as a ring of light surrounding the movable electrode. The ring of light remains about the button associated with the car call until the car call is reset by a reset signal in the time slot associated with the floor of the call, i.e., a low or true signal in the serial signal $\overline{CCR}$, at which time the liquid crystal is deenergized and it reverts to its opaque condition, and the light is no longer visible about the movable electrode of the switch. When the normal building source 202 of alternating potential fails, all of the plurality of liquid crystals 126 are switched to their light transmitting condition, greatly increasing the illumination of the car call entry panel and providing emergency illumination for the elevator car.

Figure 4:
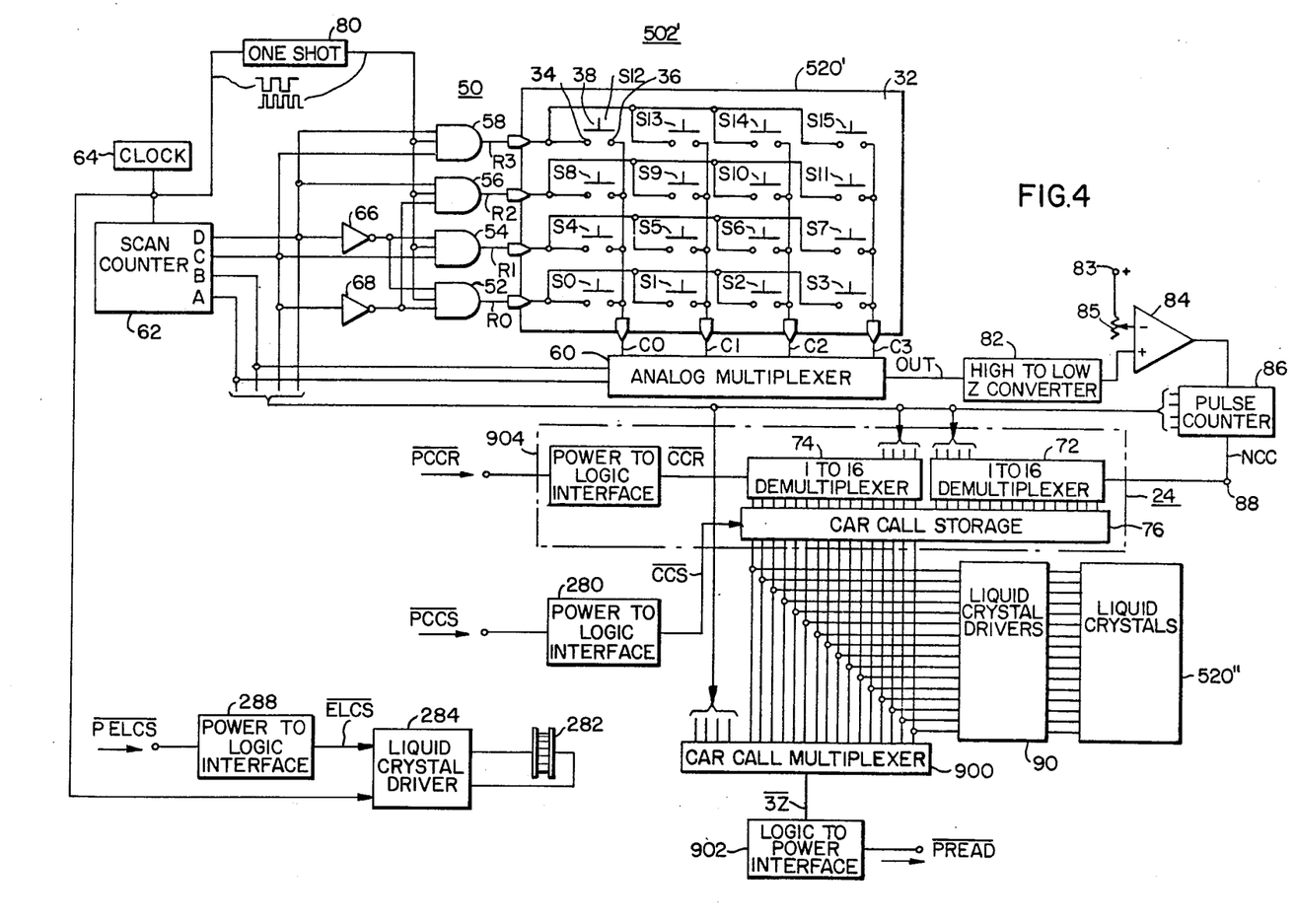
FIG. 4 is a schematic diagram of a car call entry and display station constructed according to the teachings of the invention.

FIG. 4 is a schematic diagram of a car call entry and display station 502' which may be used for the car call entry and display station shown in FIG. 1. The car call entry and display panel 520 of station 502' is shown divided into its two functions, with the call entry function being illustrated at 520' and the display function at 520''.

The call entry function 520' includes a plurality of switches, such as 16, referenced S0 through S15, which may be connected in an X-Y matrix, as illustrated. The switches may be constructed as shown in FIG. 3, having electrically conductive coatings on the surface of a printed circuit board 32, which form the stationary electrically conductive elements, electrodes or contacts of the switches, such as stationary electrodes 34 and 36 of switch S12. The means for actuating the switches S0–S15 is a movable electrode or element, such as movable electrode 38 of switch S12.

Detector means for detecting the actuation of a switch may include conventional apparatus for scanning a matrix. For example, the rows R0 through R3 may be selectively enabled by a row driver circuit 50 which may include dual input AND gates 52, 54, 56 and 58 which have their outputs connected to input terminals R0, R1, R2 and R3, respectively. The columns C0 through C3 are selectively enabled by a column driver circuit 60, such as an analog multiplexer. The matrix of switches S0–S15 are scanned by providing a 4-stage binary counter 62 driven by a clock 64 which provides input pulses for advancing the count value. The clock 64 may be a 4 KHz. oscillator. The most significant bit D of the scan counter 62 is connected directly to an input on each of the AND gates 56 and 58, and to an input on each of the AND gates 52 and 54 via an inverter 66. The next most significant bit C is connected directly to an input of each of the AND gates 54 and 58, and to an input on each of the AND gates 52 and 56 via an inverter 68. The two least significant bits A and B are connected to inputs on the analog multiplexer 60. This arrangement successively energizes rows R0 through R3, and while ech row is energized, the analog multiplexer successively connects each column conductor C0 through C3 to the output OUT.

The binary address of switch S0 is 0000, and when the output of counter 62 is 0000 the condition of switch S0 will be monitored. If the switch S0 is actuated, the output OUT will be high during the count value 0000, and if it is not actuated, the output OUT will be low during this scan or time slot. Scan slot 0000 may be assigned to the lowest floor of the building, and thus when switch S0 is actuated a car call for the lowest floor of the building would be registered. In like manner, the address of switch S1 is 0001, the address of switch S2 is 0010, etc., with the switches being associated with successively higher floors of the building.

The output OUT of the analog multiplexer 60 provides indications of car calls in serial form, which calls must be stored until reset, and the stored calls must be provided in serial form for transmission to the remotely located floor selector. If the switches S0–S15 are of the movable electrode, capacitive type, such as disclosed in FIG. 3, a bipolar or unipolar signal which has a magnitude which changes at a rate sufficient to be coupled through the capacitance of an actuated switch may be provided. Unipolar pulses at an acceptable rate may be conveniently provided by connecting an edge catcher circuit or "one shot" 80 to the output of clock 64. If clock 64 is a 4 KHz. clock, for example, the one shot 80 may be arranged to provide a pulse of short duration, such as 5 microseconds, on each transition of the clock, with each pulse being separated from the next by 125 microseconds. The output of one shot 80 is connected to an input of each of the AND gates 52, 54, 56 and 58.

When a switch is actuated, the pulses provided by the one shot 80 may be coupled through the switch and appear in the signal OUT. With the arrangement described above, 16 unipolar pulses will be applied to each row in succession, and thus each column will be enabled for four pulses. The output OUT is connected to a high-to-low impedance converter 82, such as an FET follower, and the output of converter 82 is connected to a comparator amplifier 84, such as to the non-inverting input of an operational amplifier, which ensures that the pulse magnitude exceeds a predetermined selected threshold before the pulses are allowed to pass through the comparator amplifier. The threshold may be set by connecting a source of unidirectional potential, represented by terminal 83, to the inverting input of the operational amplifier via an adjustable resistor 85. A pulse counter 86 is connected to the output of comparator 84, which insures that the signal is indeed from an actuated switch, and not merely a transient. The pulse counter 86 may be two D-type edge triggered flip-flops connected in a counter arrangement to provide an output at terminal 88 if the pulse counter receives and counts three pulses, for example. The signal at terminal 88, referred to as signal NCC, will be high during a scan slot for which a new car call has been registered. The pulse counter 86 is reset each time the scan counter 62 provides a new switch address, by connecting the output of the scan counter to the reset circuitry of the pulse counter 86.

The call storage function 24 may include a 1 to 16 demultiplexer 72, for demultiplexing the serial car call signal NCC, a 1 to 16 demultiplexer 74 for demultiplexing the serial car call reset, a power voltage to logic voltage interface 904 for reducing the voltage level of the serial car call reset signal $\overline{PCCR}$ to provide the serial car call reset signal $\overline{CCR}$, and car call memory elements 76, such as 16 J-K flip-flops, which are responsive to the outputs of the demultiplexers 72 and 74.

Each of the demultiplexers 72 and 74 receive the output of the scan counter 62, which is decoded to enable the proper gate in the demultiplexer to steer the car calls, and car call resets to the correct memory element in the car call storage 76.

The car call set signal $\overline{PCCS}$ is connected to the set inputs of the J-K flip-flops of the car call storage 76 via a power-to-logic interface 280. Thus, car calls may be set remotely from the machine room, and during an emergency lighting condition, signal $\overline{PCCS}$ is low during every scan slot to set car calls for every pushbutton and provide emergency lighting through the associated electro-optic light valves.

The 16 outputs of the car call storage 76 are connected to a 16 to 1 multiplexer 900, which also receives the output of the scan counter 62. The output of the scan counter 62 is decoded in multiplexer 900 to successively enable the 16 inputs to the multiplexer in the proper order. The serial output $\overline{READ}$ of multiplexer 900 is applied to a logic level to high voltage interface 902 to provide a high voltage signal $\overline{PREAD}$ for transmitting the serial car calls over the electrically noisy traveling cable 532.

The 16 outputs of the car call storage 76 are connected to the display function 520" of the car call entry and display station 520, to drive the appropriate indicator and display the registration of the call to the passengers in the elevator car, as well as to provide the emergency car lighting function.

The display includes a plurality of solid state electro-optic light valves which, as hereinbefore stated, are preferably of the field effect liquid crystal type, and a continuously energized light source common to all of the electro-optic light valves. Liquid crystal drivers 90 are connected between the output of the car call storage 76 and the display 520".

As hereinbefore stated, additional electro-optic light valves may be provided in the car call entry station for use only during emergency lighting conditions, which will provide still additional light within the elevator car from the light source 124. These additional electro-optic light valves are indicated generally at 282, and they may be energized by a driver 284, such as RCA's COS/-MOS CD 4054, connecting the clock 64 to the display frequency input terminal of the driver 284, and by connecting the signal $\overline{PELCS}$ to one of the inputs of the driver 284 via a power to a logic interface 288.

Figure 5:
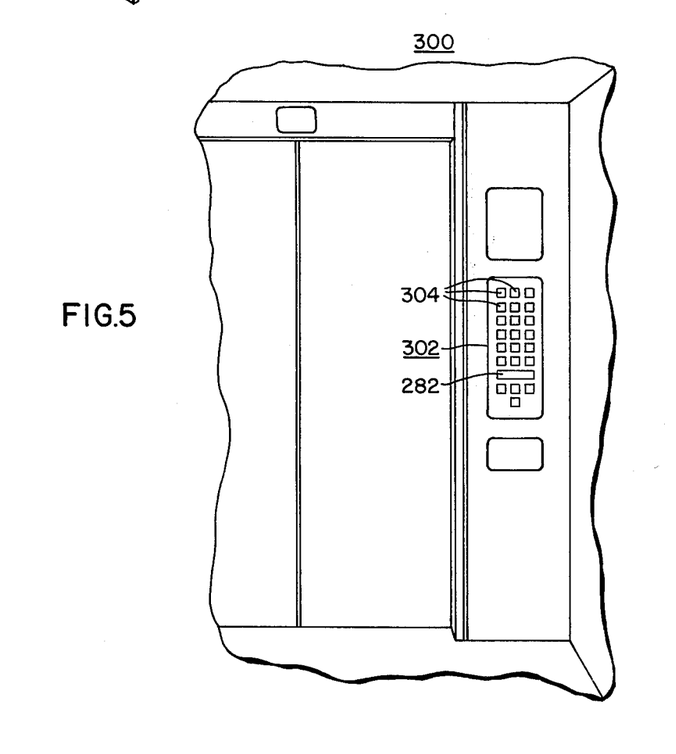

FIG. 5 is an elevational view of the interior of an elevator car 300 illustrating a car call entry station 302 having a plurality of car call buttons 304. Station 302 may be constructed as shown in FIG. 3, with all of the pushbuttons 304 being illuminated during an emergency lighting condition. The additional electro-optic light valves 282 shown in FIG. 4 are also illustrated in FIG. 5 as a translucent plastic slot 282. These additional electro-optic light valves 282 may illuminate a message for the passengers, if desired, during the emergency power condition. Since some elevator codes specify a minimum level of illumination at a point 4 feet above the floor and 1 foot in front of the car call panel 302, the additional electro-optic light valves 282 may be located 4 feet above floor level, if desired.

FIG. 6 is a fragmentary view of the elevator car 300 shown in FIG. 5, illustrating a car call entry station 310 constructed according to another embodiment of the invention. In this embodiment, the continuously energized light source 124 shown in FIG. 3 provides light through a light transmitting portion 312 of the panel, such as a portion constructed of a translucent plastic material. As illustrated in FIG. 6, in a preferred embodiment of the invention the light transmitting portion 312 of the panel is preferably a continuous, or a substantially continuous, rectangularly shaped ring or border which surrounds the pushbuttons 304. Thus, the pushbuttons 304 appear to float in a soft ring of light during normal lighting conditions. Only when normal car lighting fails will the functional aspect of the "ring of light" be apparent to the passengers. This embodiment of the invention is preferably utilized with the emergency operation of all of the electro-optic light valves, in order to provide as much light as possible in the elevator car from the light source 124. The constantly illuminated light transmitting portion 312 may include the name of the manufacturer of the elevator system, the name of the building, or any other suitable message. The translucent material may include a color filter, if desired, to make the car call station even more distinctive, but it should be selected such that it does not unduly attenuate light from the continuously energized light source. While the ring of light shown is preferred, it is to be understood that the light transmitting portion 312 may be one or more unconnected bars of translucent material, arranged horizontally above and/or below the panel, or vertically on one or both sides of the panel.

We claim as our invention:

1. An elevator system, comprising:
   an elevator car mounted for movement in a building to serve the floors therein,
   a car station in said elevator car including call means for indicating requests for elevator service,
   a normally energized light source in said car station associated with said call means,
   a first source of electrical power for said light source,
   an emergency source of electrical power connected to energize said light source upon failure of said first source of electrical power,
   and means associated with said car station which enables light from said light source to provide emergency lighting for said elevator car.

2. The elevator system of claim 1 wherein the means associated with the car station which enables light from the light source to provide emergency lighting for said elevator car includes an electro-optic light valve operable between light blocking and light transmitting conditions, and means for operating said electro-optic light valve to its light transmitting condition when the emergency source of electrical power energizes the light source.

3. The elevator system of claim 1 wherein the means associated with the car station which enables light from the light source to provide emergency lighting for the elevator car includes a plurality of electro-optic light valves operable between light blocking and light transmitting conditions, and means for operating said plurality of electro-optic light valves to their light transmitting condition when the emergency source of electrical power energizes the light source.

4. The elevator system of claim 1 wherein the call means includes:
   a plurality of switches,
   a plurality of electro-optic light valves operable between light blocking and light transmitting conditions, each of said electro-optic light valves being disposed between the light source and one of said switches, each of said electro-optic light valves being operable to its light transmitting condition in response to the actuation of its associated switch,
   and wherein the means associated with the car station which enables light from the light source to provide emergency lighting for the elevator car includes detector means for operating at least certain of said plurality of electro-optic light valves to their light transmitting condition when the emergency source of electrical power energizes the light source.

5. The elevator system of claim 4 wherein the detector means operates all of said plurality of electro-optic light valves to their light transmitting condition when the emergency source of electrical power energizes the light source.

6. The elevator system of claim 1 wherein the means associated with the car station which enables light from the light source to provide emergency lighting for the elevator car includes a panel member having opaque and light transmitting portions, with said light transmitting portions transmitting light from the light source when the light source is energized by either the first or emergency sources of electrical power.

7. The elevator system of claim 1 wherein the call means includes a plurality of switches arranged on a panel member having opaque and light transmitting portions, with said light transmitting portions transmitting light from the light source when the light source is energized by either the first or emergency sources of electrical power.

8. The elevator system of claim 7 wherein the light transmitting portion of the panel member substantially encircles the plurality of switches.

9. The elevator system of claim 7 wherein the light transmitting portion of the panel member completely encircles the plurality of switches.

10. The elevator system of claim 7 including a plurality of electro-optic light valves operable between light blocking and light transmitting conditions, each of said electro-optic light valves being disposed between a switch and the source of light and operable to a light transmitting condition in response to actuation of its associated switch, and including detector means for operating at least certain of the electro-optic light valves to their light transmitting condition when the emergency source of electrical power energizes the light source.

11. The elevator system of claim 7 including a plurality of electro-optic light valves operable between light blocking and light transmitting conditions, each of said electro-optic light valves being disposed between a switch and the source of light and operable to a light transmitting condition in response to actuation of its associated switch, and including detector means for operating said electro-optic light valves to their light transmitting condition when the emergency source of electrical power energizes the light source.

* * * * *